(12) United States Patent
Wu

(10) Patent No.: US 10,386,032 B2
(45) Date of Patent: Aug. 20, 2019

(54) VEHICLE LIGHTING MODULE

(71) Applicant: KONINKLIJKE PHILIPS N.V., Eindhoven (NL)

(72) Inventor: Ping Wu, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/324,994

(22) PCT Filed: Jul. 14, 2015

(86) PCT No.: PCT/EP2015/066087
§ 371 (c)(1),
(2) Date: Jan. 9, 2017

(87) PCT Pub. No.: WO2016/008897
PCT Pub. Date: Jan. 21, 2016

(65) Prior Publication Data
US 2017/0211772 A1    Jul. 27, 2017

Related U.S. Application Data

(63) Continuation of application No. PCT/CN2014/000673, filed on Jul. 15, 2014.

(30) Foreign Application Priority Data

Jul. 22, 2014  (EP) .................................... 14177937

(51) Int. Cl.
*F21S 41/20* (2018.01)
*F21S 43/31* (2018.01)
(Continued)

(52) U.S. Cl.
CPC .......... *F21S 41/285* (2018.01); *B60Q 1/0041* (2013.01); *B60Q 1/04* (2013.01);
(Continued)

(58) Field of Classification Search
CPC ............................ B60Q 1/04; B60Q 2400/30
See application file for complete search history.

(56) References Cited

U.S. PATENT DOCUMENTS 6,280,067 B1 * 8/2001 Albou .................. B60Q 1/1438
362/282
6,402,347 B1 * 6/2002 Maas ...................... F21V 5/007
315/312
(Continued)

FOREIGN PATENT DOCUMENTS

DE    102012105095 A1    12/2012
EP    2045514 A1    4/2009
(Continued)

OTHER PUBLICATIONS

Park, Optical Fiber Lighting Apparatus, KR 20040084181, Oct. 2004 (Year: 2004).*
(Continued)

*Primary Examiner* — Evan P Dzierzynski

(57) ABSTRACT

A vehicle lighting module is disclosed including a lighting unit comprising a solid state light element; a reflector arranged to reflect light emitted by the solid state light element; and a lens array opposite the reflector, said lens array comprising a plurality of substantially upright columnar lenses for distributing the reflected light in a plane perpendicular to the propagation direction of said upright lenses, wherein the solid state light element is arranged such that at least most of the emitted light is directed towards the reflector.

20 Claims, 9 Drawing Sheets

(51) Int. Cl.
*F21S 41/33* (2018.01)
*F21S 43/13* (2018.01)
*F21S 43/145* (2018.01)
*F21S 43/237* (2018.01)
*F21S 43/20* (2018.01)
*F21S 41/14* (2018.01)
*F21S 41/147* (2018.01)
*F21S 41/155* (2018.01)
*F21S 43/40* (2018.01)
*F21S 41/143* (2018.01)
*F21S 43/251* (2018.01)
*F21S 43/243* (2018.01)
*F21S 41/141* (2018.01)
*F21S 43/14* (2018.01)
*B60Q 1/00* (2006.01)
*F21S 41/24* (2018.01)
*F21S 43/239* (2018.01)
*F21S 41/32* (2018.01)
*B60Q 1/04* (2006.01)
*F21S 41/16* (2018.01)
*G02B 3/00* (2006.01)
*G02B 3/08* (2006.01)

(52) U.S. Cl.
CPC ............. *F21S 41/14* (2018.01); *F21S 41/141* (2018.01); *F21S 41/143* (2018.01); *F21S 41/147* (2018.01); *F21S 41/155* (2018.01); *F21S 41/16* (2018.01); *F21S 41/24* (2018.01); *F21S 41/32* (2018.01); *F21S 41/335* (2018.01); *F21S 41/336* (2018.01); *F21S 43/13* (2018.01); *F21S 43/14* (2018.01); *F21S 43/145* (2018.01); *F21S 43/237* (2018.01); *F21S 43/239* (2018.01); *F21S 43/243* (2018.01); *F21S 43/251* (2018.01); *F21S 43/26* (2018.01); *F21S 43/31* (2018.01); *F21S 43/40* (2018.01); *B60Q 2400/30* (2013.01); *G02B 3/005* (2013.01); *G02B 3/08* (2013.01)

(56) References Cited

U.S. PATENT DOCUMENTS

| | | |
|---|---|---|
| 7,980,742 B2 | 7/2011 | Albou |
| 2004/0085779 A1* | 5/2004 | Pond ........................ B60Q 1/04 362/516 |
| 2005/0111235 A1 | 5/2005 | Suzuki et al. |
| 2008/0013333 A1 | 1/2008 | Koizumi et al. |
| 2008/0151567 A1 | 6/2008 | Albou |
| 2009/0316423 A1 | 12/2009 | Futami |
| 2013/0148373 A1* | 6/2013 | Bayersdorfer ......... G02B 6/001 362/511 |
| 2013/0235608 A1 | 9/2013 | Tsai et al. |
| 2014/0063359 A1* | 3/2014 | Chen .................. G02B 27/0101 349/11 |

FOREIGN PATENT DOCUMENTS

| | | |
|---|---|---|
| EP | 2327585 A1 | 6/2011 |
| EP | 2363738 A2 | 9/2011 |
| EP | 2442013 A2 | 4/2012 |
| KR | 20040084181 | * 10/2004 |

OTHER PUBLICATIONS

EPO as ISA, "International Search Report and Written Opinion" dated Oct. 6, 2015 from International Application No. PCT/EP2015/066087, filed Jul. 14, 2015, 11 pages
CN First Office Action dated Sep. 30, 2018, China Patent Application No. 201580038610.3, 16 pages.

\* cited by examiner

US 10,386,032 B2

VEHICLE LIGHTING MODULE

CROSS-REFERENCE TO RELATED APPLICATIONS

The present application is a § 371 application of International Application No. PCT/EP2015/066087 filed on Jul. 14, 2015 and entitled "VEHICLE LIGHTING MODULE," which claims the benefit of International Application No. PCT/CN2014/000673 filed on Jul. 15, 2014 and European Patent Application No. 14177937.1 filed on Jul. 22, 2014. International Application No. PCT/EP2015/066087, International Application No. PCT/CN2014/000673, and European Patent Application No. 14177937.1 are incorporated herein.

FIELD OF THE INVENTION

The present invention relates to a vehicle lighting module including a lighting unit comprising a solid state lighting element and a reflector arranged to reflect light emitted by the solid state lighting element.

BACKGROUND OF THE INVENTION

Nowadays, many vehicles are equipped with lighting modules including solid state lighting (SSL) elements such as LEDs. Such lighting elements are attractive because the lifetime of a SSL element such as a LED is such that replacement of the lighting element is unlikely to be necessary during the lifetime of the car. In addition, such elements may be used to provide a vehicle with a distinctive appearance, for instance by arranging the SSL elements in a particular shape such as a curved line around a main lighting module of the vehicle.

However, it is not straightforward to use SSL elements to generate functional lighting that must meet strict guidelines regarding beam shape for instance, because the directional nature of the luminous distribution produced by SSL elements is quite different to the luminous distribution produced by incandescent or halogen light bulbs. It is therefore not straightforward to produce lighting modules based on SSL elements in which certain functions such as for instance a daytime running light (DRL) or low beam are generated in a compliant manner. In addition, consumers appreciate such functional lighting functions to have a homogeneous appearance, such that the SSL elements and other optical elements, e.g. reflectors, implementing such light functions should not be visible.

An example of a vehicle lighting module is provided in U.S. Pat. No. 7,980,742 B2. The lighting module disclosed herein has an optical axis and comprises at least one LED, a reflector of the complex surface type, and a cylindrical lens with substantially vertical generatrices placed between the two foci of the arc of an ellipse. The at least one LED is disposed such that its light beam has a mean direction substantially orthogonal to the geometric axis of the reflector, which is situated relative to the plane of the rear face of the light emitting diode, on the emitted beam side. However, this arrangement does not obscure the optical components from an external view, and may be less suitable to generate certain beam types.

SUMMARY OF THE INVENTION

The present invention seeks to provide a vehicle lighting module that can produce functional light beams without the internal optical elements being visible.

According to an aspect, there is provided a vehicle lighting module including a lighting unit comprising a solid state lighting element; a reflector arranged to reflect light emitted by the solid state lighting element; and a lens array opposite the reflector, said lens array comprising a plurality of substantially upright columnar lenses for distributing the reflected light in a plane perpendicular to the propagation direction of said upright lenses, wherein the solid state lighting element is arranged such that at least most of the emitted light is directed towards the reflector.

The present invention is based on the insight that a wide angle beam such as a DRL or low beam can be formed in a uniform manner by indirectly projecting the luminous output of a SSL element such as a LED onto a lens array comprising a plurality of substantially upright columnar lenses. The combination of indirectly illuminating the lens array by the SSL element using a reflector with a lens array of substantially upright columnar lenses arranged to diverge the incident illumination in a substantially horizontal plane, thereby providing a flat beam of uniform nature.

Each lens preferably has a width in a range of 1-8 mm, more preferably in a range of 2-5 mm. This provides a particularly uniform luminous distribution whilst avoiding an expensive lens array requiring a large plurality of columnar lenses.

Each lens may be a cylindrical lens extending from a main surface of the lens array by a height, wherein each lens has a width to height ratio in the range of 1:0.1 to 1:0.4. It has been found that within this ratio the lens array is capable of producing the desired beam patterns whilst meeting the required dimensions of the lighting module. Alternatively, each lens may be a prismatic lens.

In an embodiment, the lens array is dimensioned such that the reflected light distribution covers the entire lens array. In other words, the lens array may be dimensioned such that the projection generated by the reflector covers the lens array in entirety.

In order to mimic the curvature of a conventional lens, the module may comprise an optical axis, wherein a normal vector of a major surface of the lens array is angled relative to said optical axis in the upright direction under an angle in the range of −50 to 50°.

Alternatively, the lens array may comprise a curved surface facing the reflector.

The reflector may be shaped to produce a reflected light distribution in a range of −15 to 15° relative to a horizontal plane. This for instance is particularly suitable to generate a beam that complies with the specifications of the luminous distribution of a low beam. Such a reflector may for instance provide the cut-off of the luminous distribution to provide such a low beam.

Alternatively, if such a cut-off is not desired, for instance when implementing a DRL, the lighting unit may further comprise a light guide arranged to guide the light emitted by the solid state lighting element towards the reflector, wherein the light guide is placed such that the light guide does not interfere with the reflected light.

In an embodiment, the lighting unit comprises a plurality of light guides associated with the reflector and a plurality of solid state lighting elements, each solid state lighting element being arranged to emit light into one of said light guides. This yields a particulaxly bright lighting unit.

Alternatively, the lighting unit may comprise a plurality of reflectors arranged in a row, said light guide extending across said row of reflectors and comprising light scattering structures for redirecting light travelling through the light guide towards said reflectors; and a pair of solid state lighting elements arranged at opposite ends of the light guide and arranged to emit light into said light guide. This yields a vehicle lighting module that can produce a uniform luminous distribution of a DRL requiring fewer SSL elements than reflectors, thus reducing the cost of the module.

In the aforementioned embodiments, and in particular, in the embodiments relating to the low beam vehicle lighting module, the reflector may be an elliptical reflector having a near focal point and a far focal point, wherein the solid state lighting element may be positioned in the near focal point and the lens array is positioned in between the near focal point and the far focal point or beyond the far focal point in order to create a divergent luminous output, e.g. in a horizontal plane.

In both the low beam and DRL embodiments, the vehicle lighting module may contain multiple lighting units to generate the desired beam profile, e.g. to increase the luminous intensity and/or increase the (horizontal) beam angle.

For instance, the vehicle lighting module may comprise a pair of said lighting units, wherein the lens array of one of said lighting units is rotated in a clockwise direction around the optical axis of said unit by a first angle and the lens array of the other of said lighting units is rotated in a counter clockwise direction around the optical axis of said other unit by a second angle. The first and second angle may be identical, e.g. 15° or less, in order to replicate the low beam output of a traditional curved round lens used in low beam modules.

In order to further increase the luminous output and/or beam spread, the module may comprise a plurality of said lighting units, wherein the lighting units cooperate to form a row, column or grid of said lighting units.

In an embodiment, said plurality of said lighting units includes a first lighting unit including a light guide arranged to guide the light emitted by the solid state lighting element towards the reflector, wherein the light guide is placed outside the light path from the reflector to the lens array; and a second lighting unit in which the solid state lighting element is arranged to emit light directly onto the reflector. Such a vehicle lighting module can provide both a DRL and low beam output, and is therefore particularly versatile.

It is not necessary that the desired luminous output is produced using the same type of lighting units. For instance, in an embodiment the vehicle lighting module further comprises a further unit comprising a further solid state lighting element, a collimator arranged to collimate the light emitted by the further solid state lighting element and a Fresnel lens arranged to receive the collimated light. Such a hybrid vehicle lighting module may for instance be used to generate a low beam or other complex luminous distributions, i.e., beam shapes.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
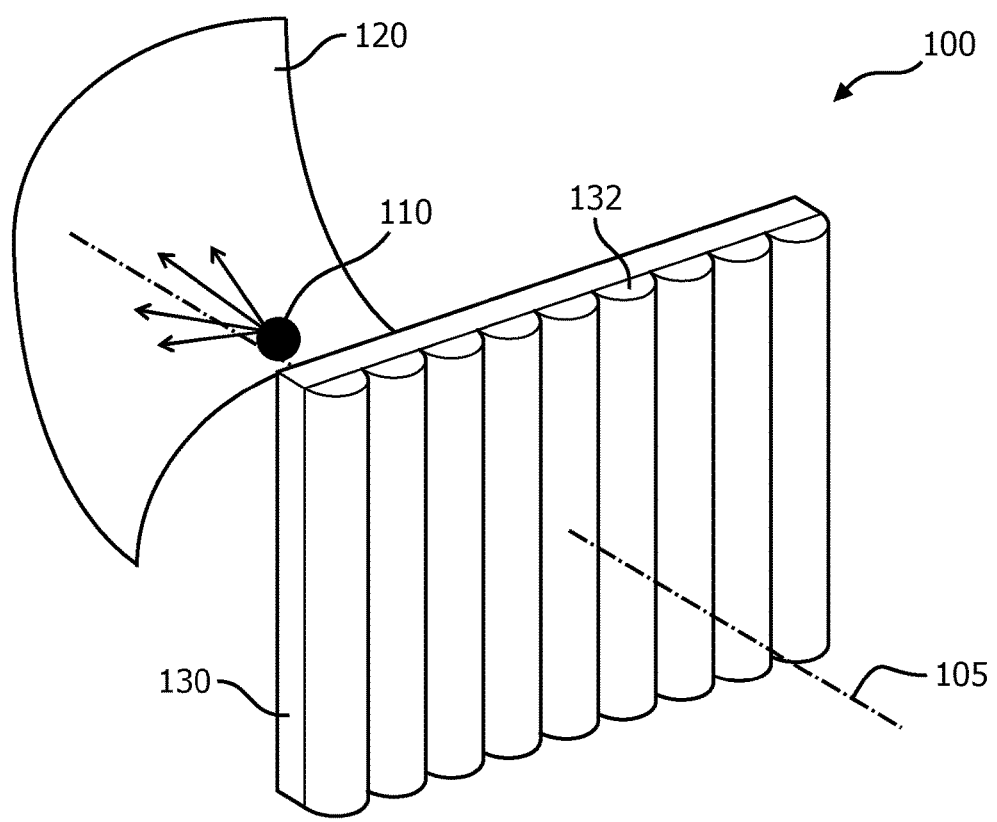
FIG. 1 schematically depicts a lighting unit of a vehicle lighting module according to an embodiment.

It should be understood that the Figures are merely schematic and are not drawn to scale. It should also be understood that the same reference numerals are used throughout the Figures to indicate the same or similar parts.

FIG. 1 schematically depicts an embodiment of a vehicle lighting module 100. Specifically, a lighting unit of such a vehicle lighting module 100 is shown. The lighting unit typically comprises at least one solid state lighting element 110, a reflector 120 and a lens array 130 comprising a plurality of substantially upright columnar lenses 132 that abut each other.

The at least one solid state lighting element 110 is arranged such that its luminous surface faces the reflector 120, wherein the reflector 120 is arranged to reflect the luminous output produced by the at least one solid state lighting element 110 towards the lens array 130. This arrangement ensures that the at least one solid state lighting element 110 cannot be directly observed external to the vehicle lighting module 100 as the at least one solid state lighting element 110 does not directly illuminate the lens array 130; instead, the image created by the reflector 120 projected onto the lens array 130 is observed, thereby avoiding that the at least one solid state lighting element 110 can be observed as a point source. The at least one solid state lighting element 110 may be implemented in any suitable manner, for instance as a light emitting diode comprising an inorganic or organic semiconductor layer. In case of multiple solid state lighting elements 110 in the lighting unit, these solid state lighting elements 110 may be identical or may be different solid state lighting elements 110, for instance solid state lighting elements 110 creating different colors, which colors may be mixed by the reflector 120 and/or the lens array 130 to produce a luminous output with particular color characteristics.

The reflector 120 may be made of any suitable material, such as a suitable polymer, which may be carrying a reflective coating, a metal or metal alloy and so on. The reflector 120 is typically dimensioned to create an image of the luminous distribution produced by the at least one solid state lighting element 110 and to project this image onto the lens array 130. In a particularly advantageous embodiment, the reflector 120 and lens array 130 are dimensioned such that the image produced by the reflector 120 covers the entire inner surface of the lens array 130, i.e. the surface facing the reflector 120. In at least some embodiments, the reflector 120 may further be dimensioned to create a cut-off in the luminous distribution produced by the at least one solid state lighting element 110.

For instance, assuming that the solid state lighting element 110 is placed in the origin of a coordinate system with a z-axis extending in parallel with the substantially upright columnar lenses 132, the reflector 120 may be arranged to cut-off the luminous distribution produced by the at least one solid state lighting element 110 that lies above the XY-plane of this system. This for instance yields a luminous pattern that may be compliant with the regulations regarding the luminous pattern of a low beam spread of a vehicle.

The reflector 120 may be an elliptical reflector in some embodiments. An elliptical reflector is characterized by having two focal points; a first focal point on the optical axis 105 near the reflector 120 and a second focal point on the optical axis 105 further away from the reflector 120. Consequently, the reflector 120 will focus light generated in the first focal point towards the second focal point. Therefore, placement of the at least one solid state lighting element 110 in the first focal point and of the lens array 130 on the optical axis 105 in between the first focal point and second focal point or beyond the second focal point will cause a divergent beam to be incident on the lens array 130.

The lens array 130 may be made of any suitable material, e.g. a suitable optical polymer or glass. The lens array 130 comprises a plurality of abutting substantially upright columnar lenses 132. In the context of the present application, substantially upright means that the columnar lenses 132 are arranged in parallel with the aforementioned z-axis or are rotated relative to this axis by an angle not exceeding 30°, more preferably not exceeding 20°.

Figure 2:
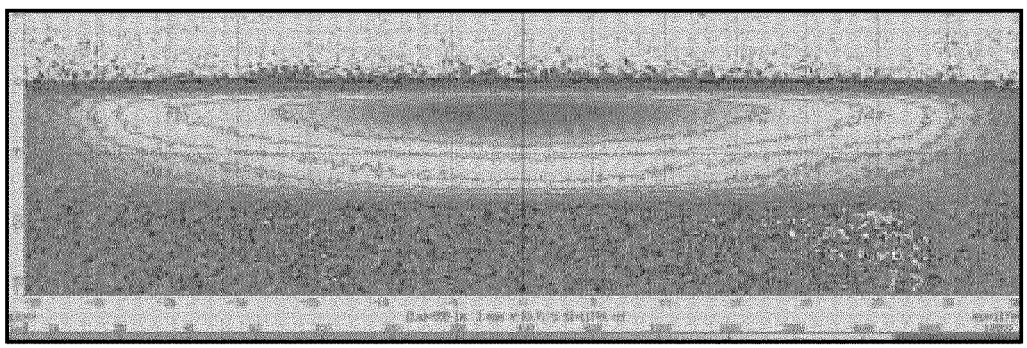
FIG. 2 depicts a luminous distribution pattern generated with the lighting unit of FIG. 1.

The substantially upright columnar lenses 132 typically spread the image produced by the reflector 120 in a horizontal plane (i.e. the aforementioned XY-plane) without (significantly) spreading the image in a vertical plane, such that a very flat luminous distribution can be produced by the vehicle lighting module 100, such as a low beam spread. This is demonstrated in FIG. 2, which depicts a luminous distribution produced by the vehicle lighting module 100 of FIG. 1, wherein the reflector 120 and lens array 130 cooperate to cut-off the luminous output generated by the at least one solid state lighting element 110 above the XY-plane. This yields a very flat luminous distribution, i.e. a luminous distribution having a vertical spread of less than 10° (from 0° to −10°) and a horizontal spread over a range of about 60° (from −30° to 30°). This luminous distribution meets the requirements of a low beam spread, thereby demonstrating that vehicle lighting module 100 of FIG. 1 can be used as a low beam lighting module in a vehicle.

In at least some embodiments, the distance between the reflector 120 and the lens array 130 is at least 10 mm, preferably at least 30 mm, more preferably at least 50 mm.

It should be understood that the vehicle lighting module 100 may comprise one or more of such lighting units, some example embodiments of which will be shown in more detail later; specifically, the vehicle lighting module 100 may comprise a plurality of such lighting units, which may be arranged in a row, column, grid and so on, wherein the lighting units are arranged to cooperate to implement the required optical function of the vehicle lighting module 100. In case of a plurality of such lighting units, different lighting units may comprise the same or different solid state lighting elements 110, for instance different color solid state lighting elements 110 to produce a luminous output of a particular color by mixing the different colors using the reflectors 120 and/or the lens array 130. In the case of such multiple lighting units, each lighting unit may comprise a portion of a single lens array 130, or each lighting unit may comprise a separate lens array 130, wherein the separate lens arrays cooperate to form a modular lens array.

In FIG. 1, the lens array 130 is oriented perpendicularly to the optical axis 105 of the lighting unit, that is, the angle between the plane of the lens array 130 and the optical axis 105 is 90°. However, it may be desirable to place the lens array 130 under a tilt angle with the optical axis 105, that is the angle between the plane of the lens array 130 and the optical axis 105 is less than 90°, for instance to create the appearance of a curved lens, by using multiple lighting units each having its lens array 130 tilted under a different angle to create this optical effect.

Figure 3:
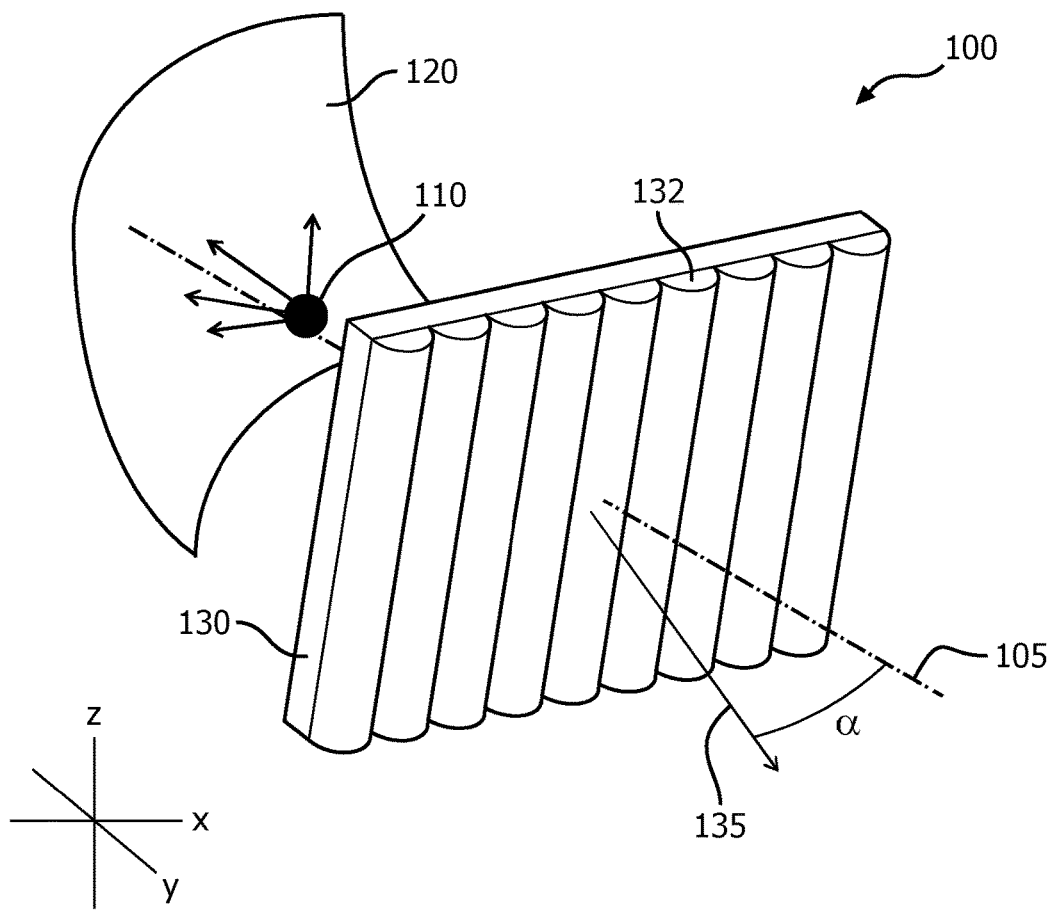
FIG. 3 schematically depicts a lighting unit of a vehicle lighting module according to another embodiment.

An example of such a lighting unit is shown in FIG. 3, showing the lens array 130 tilted relative to the z-axis, i.e. tilted away from the XY-plane by a tilt angle. In this embodiment, a normal vector of a major surface of the lens array is angled relative to said optical axis in the upright direction under a tilt angle in the range of −50 to 50°, with different lighting units having different tilt angles to create a modular lens array 130 giving the appearance of an approximated spherical lens.

Figure 4:
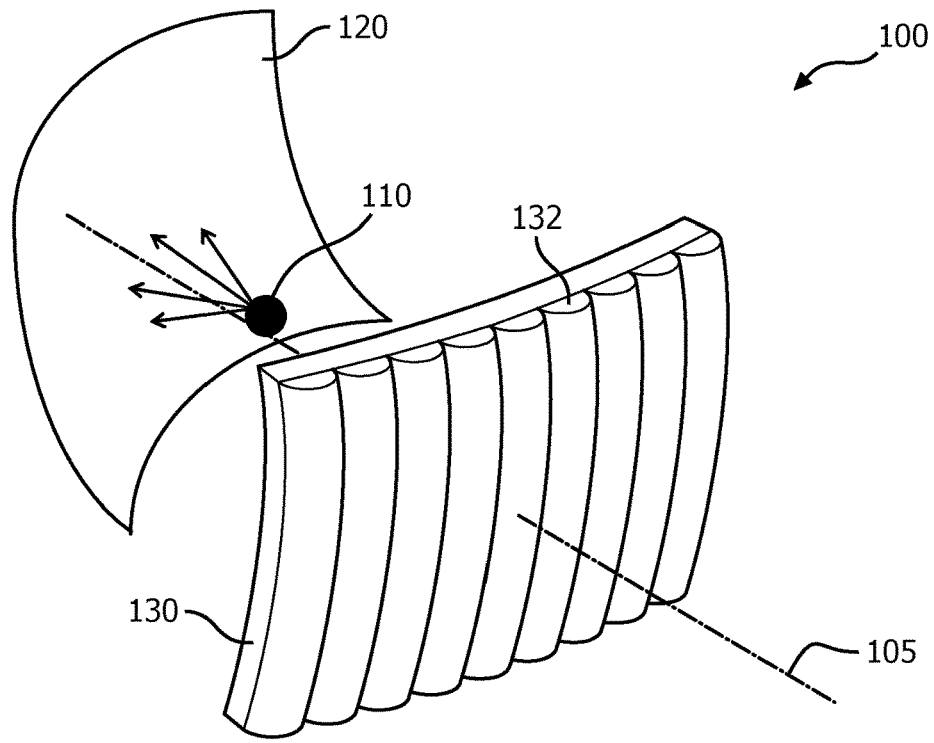
FIG. 4 schematically depicts a lighting unit of a vehicle lighting module according to yet another embodiment.

Alternatively, the appearance of a spherical lens may be created by using a curved lens array 130 as shown in FIG. 4, wherein the different lens arrays 130 of the respective lighting units combine to create this appearance.

Figure 5:
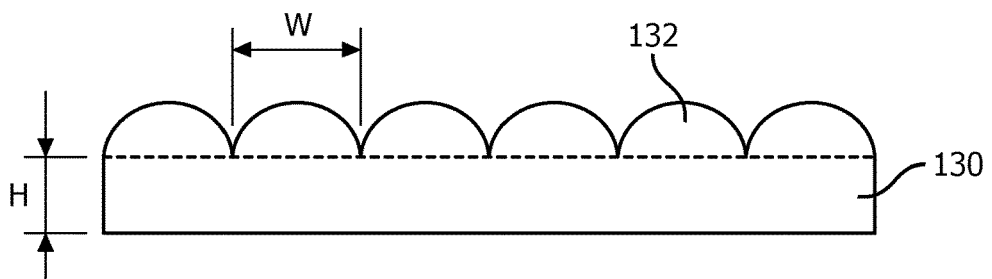
FIG. 5 schematically depicts a lens array for use in a vehicle lighting module according to one or more embodiments.

The lenses 132 may have any suitable shape although certain shapes are particularly preferred as they may provide a wide and uniform horizontal spread of the image created by the reflector 120. A first example of a particularly suitable lens shape is shown in FIG. 5, in which the lens array 130 comprises a plurality of cylindrical columnar lenses 132, wherein the curved surface of each columnar lens 132 may be a spherical or aspherical surface. Each lens 132 has a height H measured from a main surface of the lens array 130 and a width W. The height H and the width W may be individually optimised according to design requirements. For instance, for a vehicle lighting module 100 designed for use as a low beam module, particularly good results are achieved when W is chosen in the range of 1-8 mm, more preferably in the range of 2-5 mm, and H is chosen such that the ratio W/H is in the range of 1:0.1 to 1:0.4. However, it should be understood that other ranges may also be feasible, for instance if the vehicle lighting module 100 is to implement a different type of beam.

Figure 6:
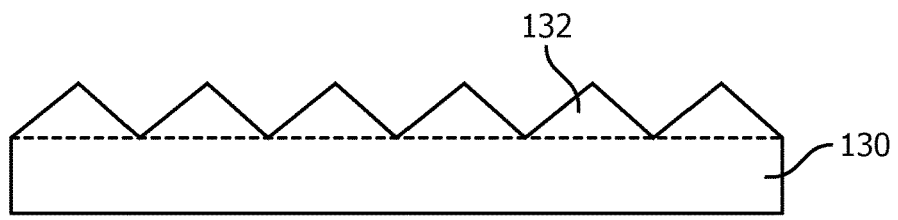
FIG. 6 schematically depicts another lens array for use in a vehicle lighting module according to one or more embodiments.

It should furthermore be understood that the shape of the upright columnar lenses 132 is not restricted to a cylindrical shape. Any shape that can generate a spread of the image generated by the reflector 120 in a horizontal plane may be contemplated. An example of such an alternatively shaped lens 132 is shown in FIG. 6, in which the lenses 132 have a prismatic or triangular shape.

As previously mentioned, multiple lighting units may be combined to form a vehicle lighting module 100. For instance, it may be necessary to combine several lighting units to achieve a luminous output (beam) that complies with the applicable regulations. For example, in at least some jurisdictions a low beam must have a cut-off angle of 15° in order to comply with the relevant regulations.

Figure 7:
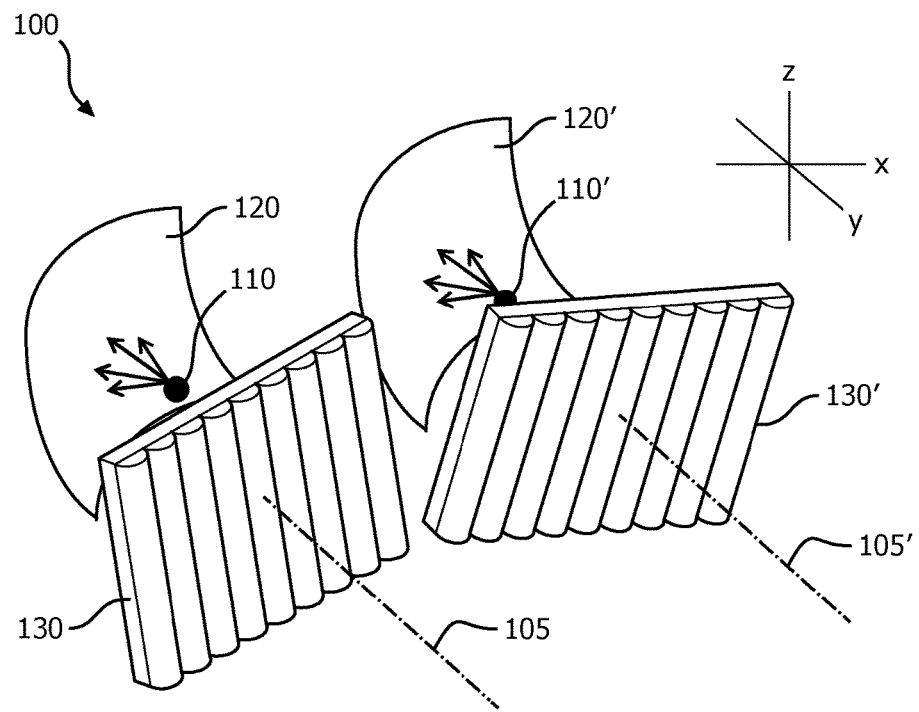
FIG. 7 schematically depicts a vehicle lighting module according to a further embodiment.

An example of a vehicle lighting module 100 implementing such a cut-off beam is shown schematically in FIG. 7. The vehicle lighting module 100 comprises a first lighting unit having at least one solid state lighting element 110, reflector 120 and lens array 130 as previously described, and the second lighting unit having at least one solid state lighting element 110', reflector 120' and lens array 130' as previously described. The difference between the first lighting unit and the second lighting unit is that the lens array 130 of the first lighting unit is rotated around the optical axis 105 by a first angle in a counter-clock-wise direction and the lens array 130' of the second lighting unit is rotated around the optical axis 105' by a second angle in a clockwise direction. The first angle may be identical to the second angle if a symmetrical luminous distribution is to be achieved. For instance, the first angle and second angle may be 15° to implement the aforementioned low beam with 15° cut-off.

Figure 8:
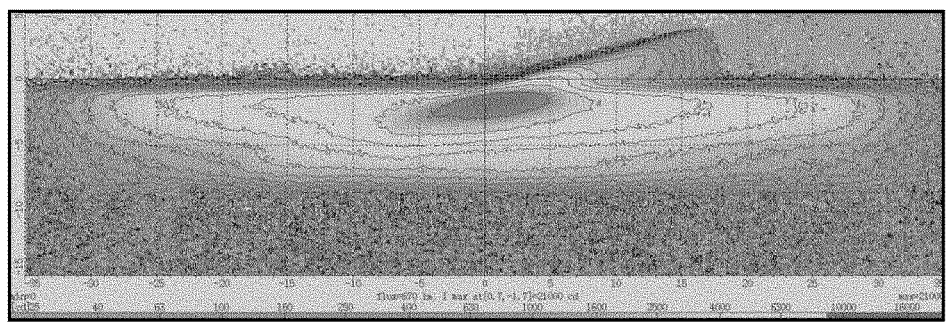
FIG. 8 depicts a luminous distribution pattern generated with the vehicle lighting module of FIG. 7.

A simulation of the luminous distribution produced by this vehicle lighting module 100 can be seen in FIG. 8. It is noted that in this embodiment the reflector 120 and the reflector 120' are not required to be rotated around the respective optical axes 105 and 105' to match the rotation of the first lens array 130 and the second lens array 130', although it is of course feasible to rotate the reflector 120 and the reflector 120' in this manner if the respective images generated by these reflectors are to be projected on the corresponding lens arrays in such a manner that the image covers the entire surfaces of these lens arrays. Alternatively, the shape of the reflector 120 and the reflector 120' may be adjusted to achieve this projection.

As mentioned above, multiple lighting units may be combined to form a vehicle lighting module 100 of the present invention. In some embodiments, these lighting units may be identical, although the orientation of at least some of these lighting units or parts thereof such as the lens arrays 130 as explained with the aid of FIGS. 7 and 8, may be varied to achieve a particular optical and/or aesthetical effect. In some other embodiments, different types of lighting units may be combined to achieve such effects. In particular, different types of lighting units may be used having different types of optical arrangements to achieve the desired luminous distribution, e.g. to form different components of the desired luminous distribution, which may be combined to form the desired luminous distribution. For instance, in FIG. 7 the first lighting unit may be arranged to produce the spreading part of the luminous distribution and the second lighting unit may be arranged to produce the 15° cut-off parts of the luminous distribution. When combined, these lighting units can produce a luminous distribution in the form of a 15° cut-off low beam pattern. In FIG. 8, a simulated 15° cut-off low beam pattern example generated by such a combination of lighting units is depicted.

Figure 9:
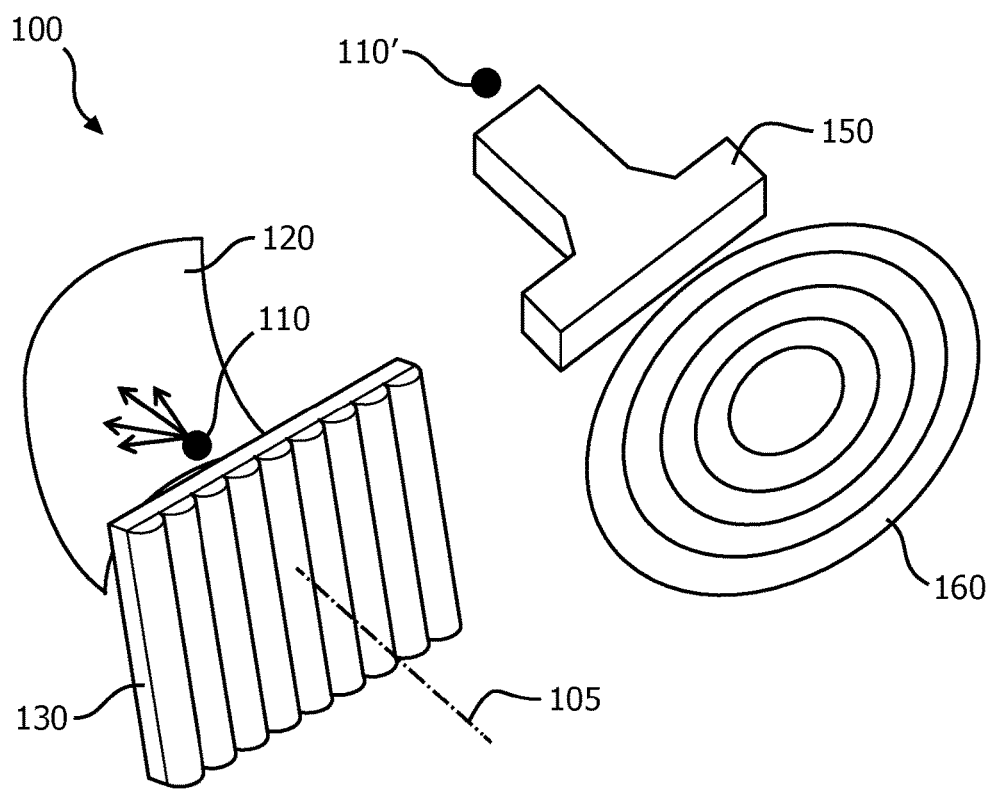
FIG. 9 schematically depicts a vehicle lighting module according to a yet further embodiment.
Figure 10:
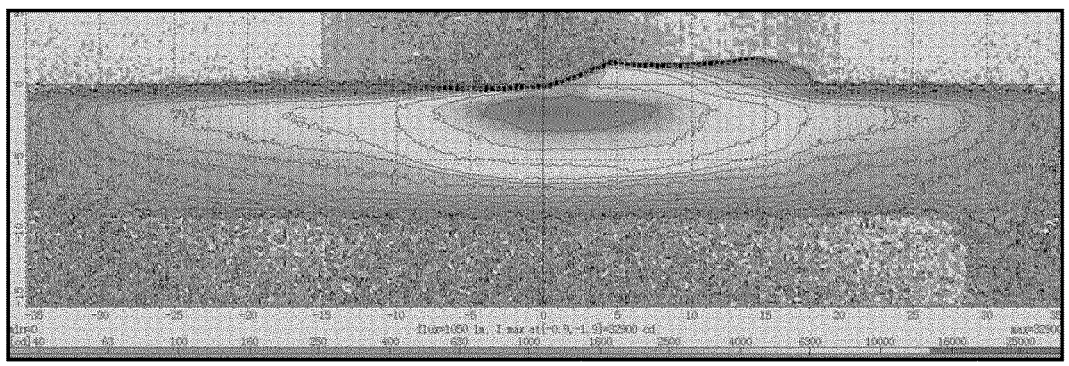
FIG. 10 depicts a luminous distribution pattern generated with the vehicle lighting module of FIG. 9.

Another example of such a hybrid vehicle lighting module 100 is shown schematically in FIG. 9, in which in addition to the lighting unit described above, a further lighting unit is present comprising a further solid state lighting element 110', which further solid state lighting element 110' is arranged such that its luminous output is coupled into a collimator 150, with the luminous output of the collimator 150 being projected onto a Fresnel lens 160. The lens array 130 may be arranged to produce the low beam spread part, whereas the Fresnel lens 160 may be arranged to produce the 40° cut-off hotspot, As explained before, when combined, the lens array 130 and the Fresnel lens 160 may produce the desired 40° cut-off low beam spread, as can be seen from the simulated luminous distribution of the vehicle lighting module 100 of FIG. 9 as shown in FIG. 10.

Figure 11:
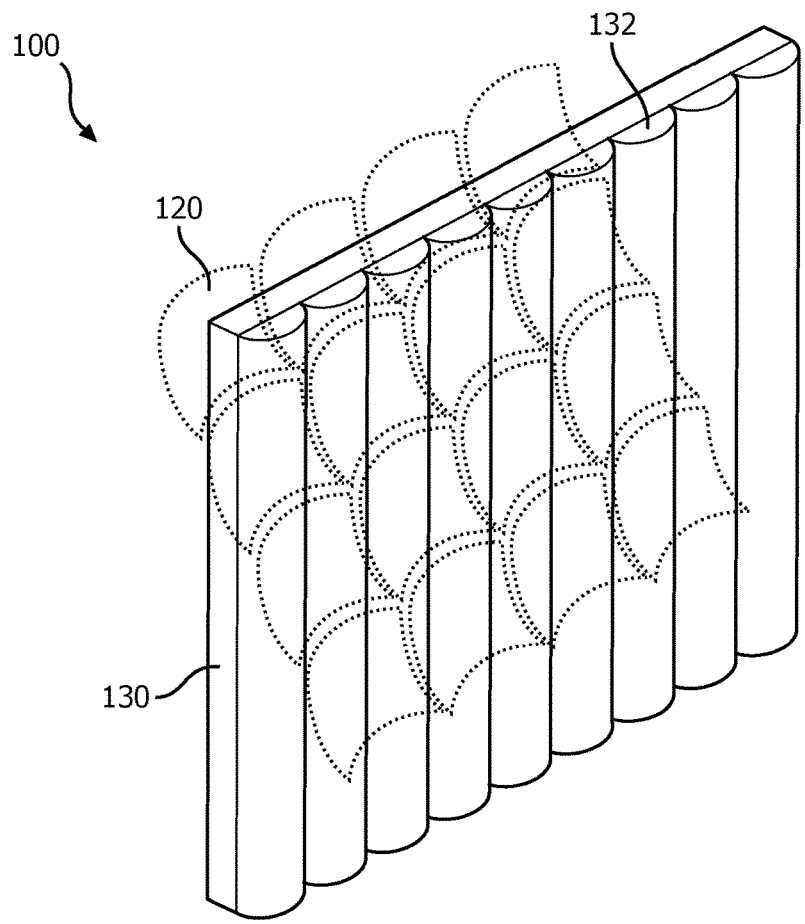
FIG. 11 schematically depicts a vehicle lighting module according to a still further embodiment.
Figure 12:
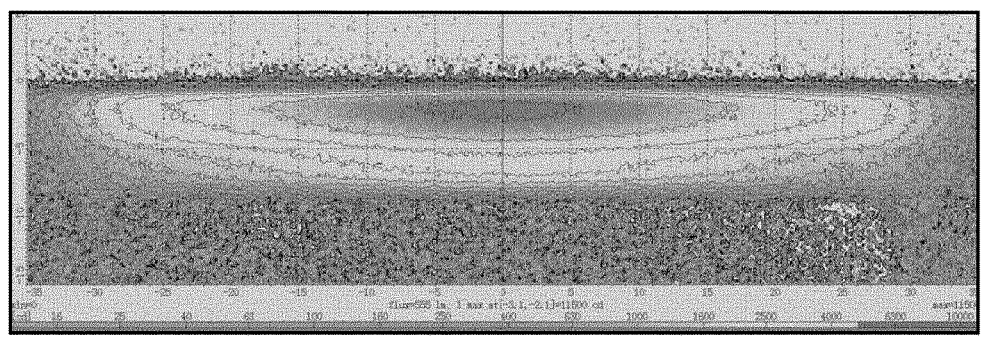
FIG. 12 depicts a luminous distribution pattern generated with the vehicle lighting module of FIG. 11.

FIG. 11 schematically depicts another embodiment of a vehicle lighting module 100, in which multiple reflectors 120 are arranged in a grid (i.e. a two-dimensional array) such that the respective images generated by these reflectors 120 from the solid state lighting elements associated with these reflectors 120 (the solid state lighting elements are not shown for reasons of clarity only) are projected onto a single lens array 130 such that a homogeneous luminous output is produced by the lens array 130. A simulation of the thus produced luminous distribution is shown in FIG. 12.

Compared to conventional low beam lighting modules, the low beam vehicle lighting module 100 according to embodiments of the present invention benefits from a simplified design that has a distinctive appearance. In particular, the total complexity of the vehicle lighting module 100 is significantly reduced compared with conventional lens systems that require multiple projection lenses to achieve the desired luminous distribution, i.e. a low beam.

At this point, it is noted that the vehicle lighting module 100 is not limited to low beam lighting modules only. It is for instance equally feasible to change the shape of the reflector 120 and/or the orientation of the at least one solid state lighting element 110 in the lighting units of such a vehicle lighting module 100 in order to alter the shape of the beam generated by the vehicle lighting module 100.

Figure 13:
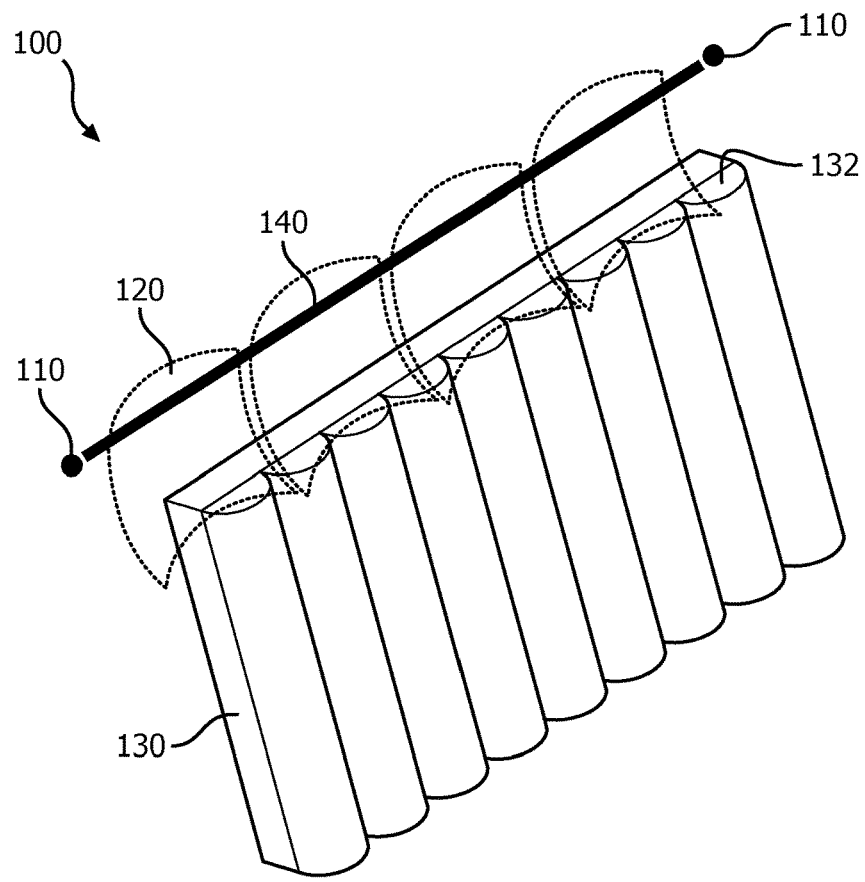
FIG. 13 schematically depicts a vehicle lighting module according to an alternative embodiment.

For instance, the vehicle lighting module 100 may be arranged to generate a DRL (daytime riding light). An example embodiment of a vehicle lighting module 100 implementing such a DRL is shown in FIG. 13. In this embodiment, the vehicle lighting module 100 further comprises a light guide 140 that extends across a row of reflectors 120, with solid state lighting elements 110 placed at opposite ends of the light guide 140 and arranged such that the luminous output of these solid state lighting elements 110 is coupled into the light guide 140. Multiple reflectors 120 are used to increase the luminous area created by the vehicle lighting module 100. The light guide 140 and the solid state lighting elements 110 are typically arranged above the row of reflectors 120 such that the light guide 140 and the solid state lighting elements 110 do not interfere with the images created by the reflectors 120. As before, the reflectors 120 are arranged such that the images generated by the reflectors 120 combine onto the lens array 130 such that the lens array 130 produces a homogeneous luminous distribution with the substantially upright columnar lenses 132.

The light guide 140 may generate a virtual 2-D light source. In an embodiment, the light guide 140 may be located in the vicinity of the (near) focal point of the reflectors 120. The light guide 140 may be made of any suitable material, e.g. a suitable optical grade polymer such as polycarbonate, PPMA or PET, glass or the like. The light guide 140 may comprise scattering structures (not shown) to couple light out of the light guide 140 such that this light emitted by the light guide 140 is directed towards the reflectors 120.

Figure 14:
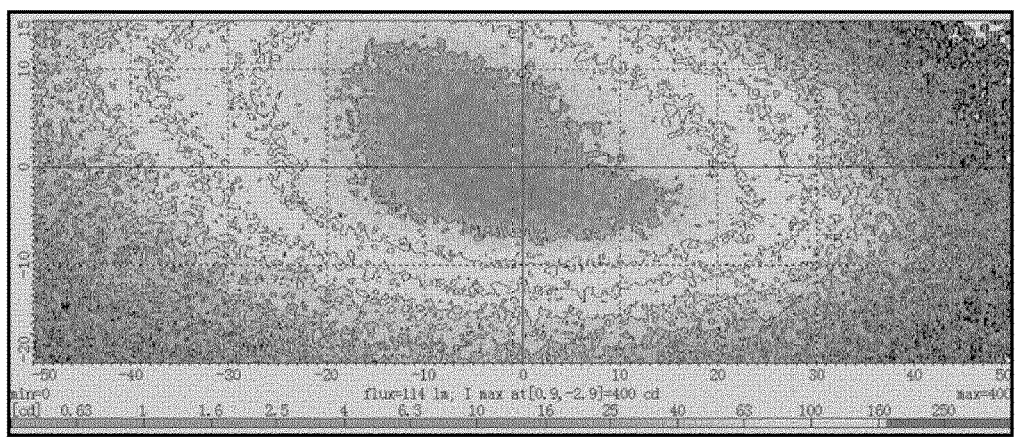
FIG. 14 depicts a luminous distribution pattern generated with the vehicle lighting module of FIG. 13.

A particularly attractive aspect of this embodiment is that relatively large area reflectors 120 that create a large light emitting area can be combined with a light guide 140 having a relatively small diameter to achieve a relatively compact DRL module. As explained before, the reflectors 120 spread light in both horizontal and vertical directions, with the lens array 130 further spreading the light substantially in a horizontal direction as previously explained. In this manner, a DRL profile can be achieved using relatively few optical components. FIG. 14 depicts the simulated luminous output of the vehicle lighting module 100 of FIG. 13, from which it can be recognised that the vehicle lighting module 100 generates a luminous profile compliant with DRL requirements.

Figure 15:
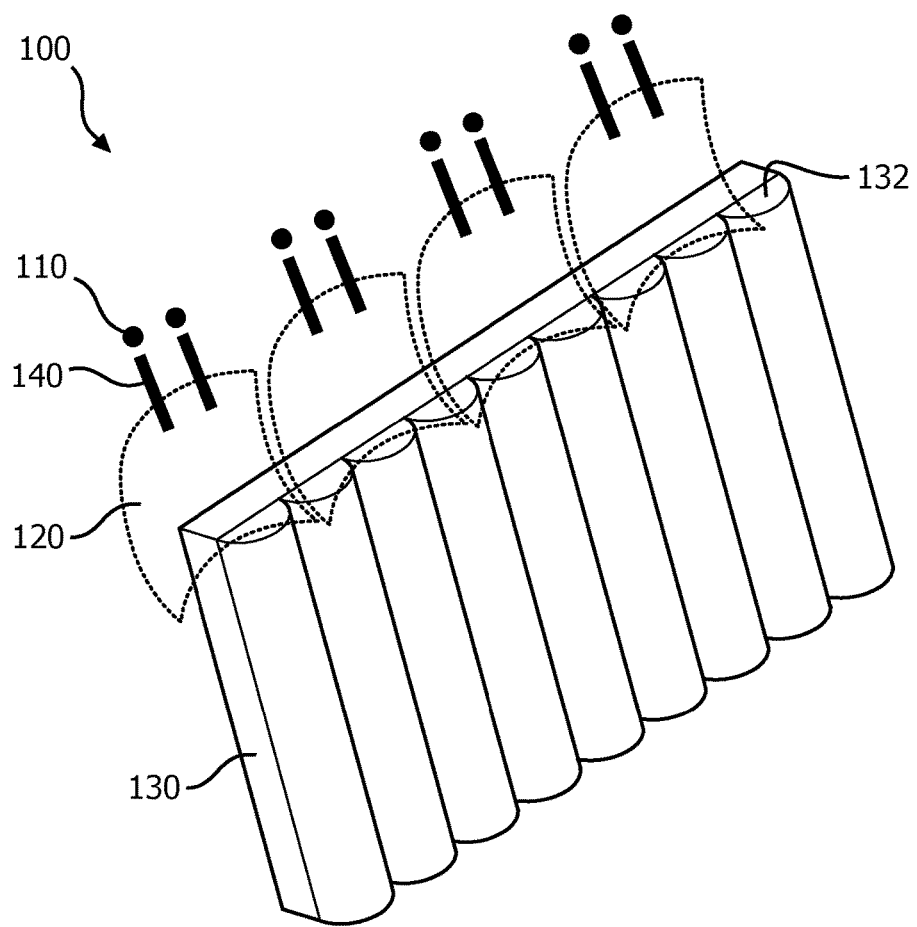
FIG. 15 schematically depicts a vehicle lighting module according to yet another embodiment.

In order to improve the luminous flux and/or luminous efficiency of a vehicle lighting module 100 implementing a DRL, each reflector 120 may be associated with at least one light guide 140. An example embodiment is shown schematically in FIG. 15, in which each reflector 120 is associated with a pair of light guides 140, with each light guide 140 being associated with a solid state lighting element 110 arranged to couple its luminous output into the associated light guide 140. As before, the light guides 140 may be placed above the reflectors 120 such that the light guides 140 do not interfere with the images created by the respective reflectors 120. Consequently, each reflector 120 receives a larger luminous flux due to the fact that each reflector 120 is associated with at least one solid state lighting element 110, thereby improving the luminous efficiency and/or luminous flux of the vehicle lighting module 100.

In some embodiments, the vehicle lighting module 100 may comprise different lighting units that implement different optical functions, e.g. different beam types, thereby providing a configurable vehicle lighting module 100. For instance, the vehicle lighting module 100 may comprise a first lighting unit arranged to produce a first optical function selected from a low beam, a high beam and a DRL and a second lighting unit arranged to produce a second optical function selected from a low beam, a high beam and a DRL, wherein the first optical function is different to the second optical function.

Figure 16:
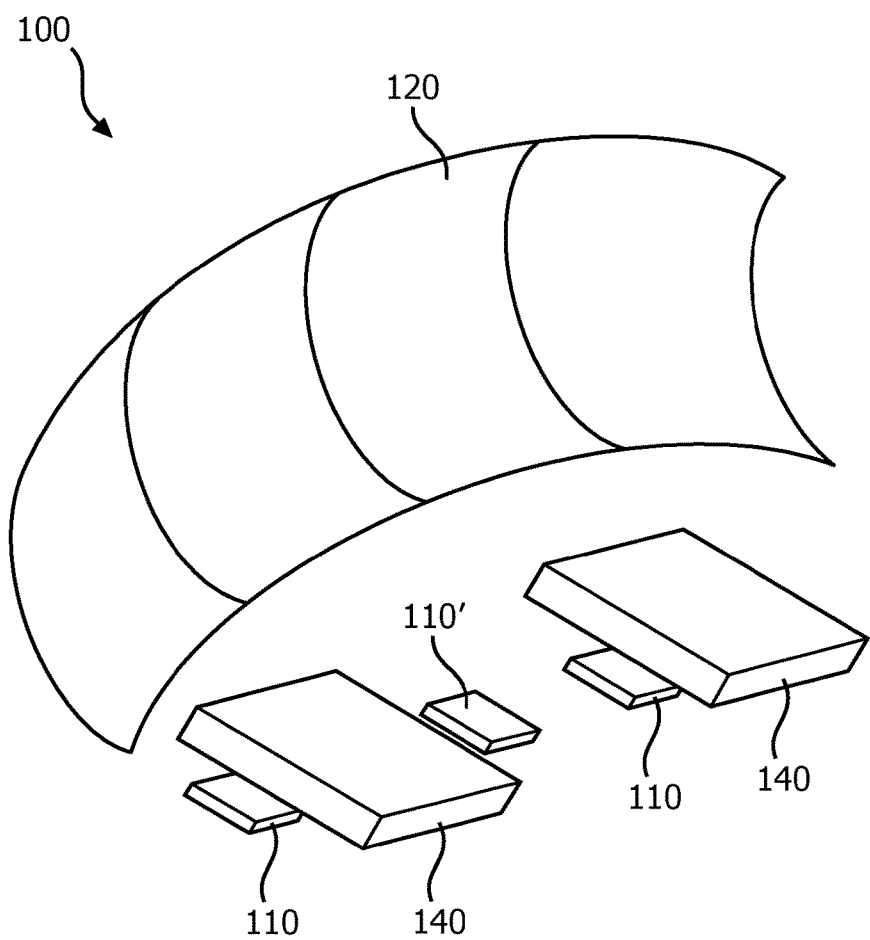
FIG. 16 schematically depicts a vehicle lighting module according to yet another embodiment.

FIG. 16 schematically depicts an example embodiment of such a configurable vehicle lighting module 100, in which the lens array 130 has been omitted for the sake of clarity; it should be understood that the lens array 130 is still present in this embodiment. The configurable vehicle lighting module 100 comprises a pair of DRL lighting units each having a solid state lighting element 110 arranged to couple its luminous output into an associated light guide 140 and a second lighting unit configured to generate a low beam, which second lighting unit comprises the solid state lighting element 110'. An array of reflectors 120 is provided to reflect the luminous output produced by the DRL lighting units and the low beam lighting unit respectively towards the lens array (not shown). The solid state lighting elements 110 on the one hand and the solid state lighting element 110' on the other hand may be individually controlled such that a driver of the vehicle can select the DRL or low beam as required. This is well-known per se.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:
1. A vehicle lighting module including,
a low beam, high beam, or daytime running light (DRL) lighting unit to generate a flat beam of a uniform nature, comprising:
a solid state lighting element;
a reflector arranged to reflect light emitted by the solid state lighting element; and
a lens array opposite the reflector, said lens array comprising a plurality of abutting substantially upright columnar lenses for distributing the reflected light in a plane perpendicular to a light propagation mean direction of said upright columnar lenses,
wherein the upright columnar lenses are arranged in parallel with a vertical axis,
wherein the lens array is distinct from the reflector,
wherein the reflector comprises an optical axis, the solid state lighting element being positioned on the optical axis, and the lens array being positioned on the optical axis beyond the solid state lighting element,
wherein the solid state lighting element is arranged such that at least most of the emitted light is directed towards the reflector, and
wherein the reflector is arranged such that the reflected light covers several of the upright columnar lenses of the lens array.
2. The vehicle lighting module of claim 1, wherein each upright columnar lens has a width in a range of about 1 mm to about 8 mm.
3. The vehicle lighting module of claim 2, wherein each upright columnar lens is a cylindrical lens extending from a main surface of the lens array by a height (H), and wherein each upright columnar lens has a width (W) to height (H) ratio in the range of about 1:0.1 to about 1:0.4.
4. The vehicle lighting module of claim 2, wherein each upright columnar lens is a prismatic lens extending from a main surface of the lens array.
5. The vehicle lighting module of claim 1, wherein each upright columnar lens is a cylindrical lens extending from a main surface of the lens array by a height (H), wherein each upright columnar lens has a width (W) to height (H) ratio in a range of about 1:0.1 to about 1:0.4.
6. The vehicle lighting module of claim 5, wherein the lens array is dimensioned such that reflected light covers the lens array in entirety.
7. The vehicle lighting module of claim 1, wherein the module comprises an optical axis, and wherein a normal vector of a major surface of the lens array is angled relative to said optical axis in the upright direction under an angle ($\alpha$) in a range of about $-50°$ to about $50°$.
8. The vehicle lighting module of claim 1, wherein the lens array comprises a curved surface facing the reflector.
9. The vehicle lighting module of claim 1, wherein the reflector is shaped to produce a reflected light distribution in a range of about $-15°$ to about $15°$ relative to a horizontal plane.
10. The vehicle lighting module of claim 1, wherein the lighting unit further comprises a light guide arranged to guide the light emitted by the solid state lighting element towards the reflector, wherein the light guide is placed such that the light guide does not interfere with reflected light off of the reflector.
11. The vehicle lighting module of claim 10, wherein the lighting unit comprises a plurality of light guides associated with the reflector and a plurality of solid state lighting elements, each solid state lighting element being arranged to emit light into one of said light guides.

12. The vehicle lighting module of claim 10, wherein the lighting unit comprises:
   a plurality of reflectors arranged in a row, said light guide extending across said row of reflectors and comprising light scattering structures for redirecting light travelling through the light guide towards said reflectors; and
   a pair of solid state lighting elements arranged at opposite ends of the light guide and arranged to emit light into said light guide.

13. The vehicle lighting module of claim 1, wherein the reflector is an elliptical reflector having a near focal point and a far focal point, wherein the solid state lighting element is positioned in the near focal point and the lens array is positioned in between the near focal point and the far focal point or beyond the far focal point.

14. The vehicle lighting module of claim 1, comprising a pair of said lighting units, wherein the lens array of at least one of said lighting units is rotated in a clockwise direction around an optical axis of said unit by a first angle and the lens array of the other of said lighting units is rotated in a counterclockwise direction around an optical axis of said other of said lighting units by a second angle.

15. The vehicle lighting module of claim 1, wherein said module comprises a plurality of said lighting units, wherein the lighting units cooperate to form a row, column, or grid of said lighting units.

16. The vehicle lighting module of claim 15, wherein said plurality of said lighting units includes:
   a first lighting unit including a light guide arranged to guide the light emitted by the solid state lighting element of the first lighting unit towards the reflector of the first lighting unit, wherein the light guide is placed outside a light path from the reflector of the first lighting unit to the lens array of the first lighting unit; and
   a second lighting unit in which the solid state lighting element of the second lighting unit is arranged to emit light directly onto the reflector of the second lighting unit.

17. The vehicle lighting module of claim 16, wherein the lens array comprises a curved surface facing the reflector.

18. The vehicle lighting module of claim 16, wherein the reflector is an elliptical reflector having a near focal point and a far focal point.

19. The vehicle lighting module of claim 18, wherein the solid state lighting element is positioned in the near focal point and the lens array is positioned in between the near focal point and a point at or beyond the far focal point.

20. The vehicle lighting module of claim 1, further comprising a further lighting unit comprising a further solid state lighting element, a collimator arranged to collimate the light emitted by the further solid state lighting element and a Fresnel lens arranged to receive the collimated light.

* * * * *